(12) United States Patent
Nakagawa et al.

(10) Patent No.: US 6,773,806 B1
(45) Date of Patent: Aug. 10, 2004

(54) ADHESIVE TAPE AND SUBSTRATE FOR ADHESIVE TAPE

(75) Inventors: Yoshio Nakagawa, Ibaraki (JP); Shigeki Ishiguro, Ibaraki (JP); Masayoshi Natsume, Ibaraki (JP); Shinichi Takada, Ibaraki (JP); Kooki Ooyama, Ibaraki (JP); Hajime Yanagida, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/705,838

(22) Filed: Nov. 3, 2000

(30) Foreign Application Priority Data

Nov. 4, 1999 (JP) ............................................. 11-314103
Sep. 22, 2000 (JP) ........................................ 2000-288649

(51) Int. Cl.⁷ ............................ B32B 15/04; B32B 7/12; B32B 27/08
(52) U.S. Cl. ................................ 428/343; 428/355 EN; 428/355 AC; 428/519; 428/520
(58) Field of Search ................................. 428/343, 519, 428/520, 355 EN, 355 AC

(56) References Cited

U.S. PATENT DOCUMENTS

| 4,067,847 A | 1/1978 | Yui et al. |
| 5,498,476 A | 3/1996 | Tucker et al. |

FOREIGN PATENT DOCUMENTS

| JP | 60 97509 | 5/1985 |
| JP | 60 97510 | 5/1985 |
| JP | 62 135545 | 6/1987 |
| JP | 63 37509 | 2/1988 |
| JP | 63 43205 | 2/1988 |
| JP | 63 43207 | 2/1988 |
| JP | 20 38434 | 2/1990 |
| JP | 05-047249 | 2/1993 |
| JP | 05-194915 | 8/1993 |
| JP | 2000-169799 | 6/2000 |
| WO | WO 97/05206 | 2/1997 |
| WO | WO 99/35202 | 7/1999 |

OTHER PUBLICATIONS

Patent Abstracts of Japan, 17 (337) (JP 05–047249) (Jun. 25, 1993).

*Primary Examiner*—Terrel Morris
*Assistant Examiner*—Victor Chang
(74) *Attorney, Agent, or Firm*—Leydig, Voit & Mayer, Ltd.

(57) ABSTRACT

The present invention provides an adhesive tape containing a substrate and an adhesive layer formed on at least one side of the substrate, wherein the substrate contains an olefin polymer and a flame retardant, but substantially no halogen atom, and the adhesive tape has a thermal deformation at 100° C. of not more than 65%. The present invention also provides a substrate containing an olefin polymer and a flame retardant, but substantially no halogen atom, wherein the olefin polymer contains the following Component A and Component B:

Component A: a thermoplastic resin having a carbonyl oxygen atom in the molecular skeleton Component B: a polymer alloy containing an ethylene component and a propylene component.

The adhesive tape and the substrate for the adhesive tape of the present invention are free of generation of dioxin and toxic gas upon incineration, and show superior resistance to thermal deformation, flame resistance and superior stretchability in combination.

13 Claims, 1 Drawing Sheet

ADHESIVE TAPE AND SUBSTRATE FOR ADHESIVE TAPE

TECHNICAL FIELD OF THE INVENTION

The present invention relates to an adhesive tape having a superior flame resistance and a substrate for the adhesive tape.

BACKGROUND OF THE INVENTION

A conventional adhesive tape comprising a substrate for an adhesive tape (hereinafter to be also referred to simply as a substrate), which is made from polyvinyl chloride (hereinafter to be abbreviated as PVC), is superior in mechanical properties (particularly flexibility and stretchability), flame resistance, resistance to thermal deformation, and electrical insulation property. Combined with its beneficial economical aspect, the above-mentioned tape has been widely used as an insulating tape for electric equipment used in the fields of vehicles, such as automobile, train, bus and the like, aircraft, ship, house, plant and the like. Particularly, an adhesive tape to be wound around a wire harness to be used for electric wires in automobile and the like, a coil for household electric appliances, an electric wire and the like, is required to show high flame resistance (oxygen index of not less than 25%) and high resistance to thermal deformation. To meet these requirements, an adhesive tape using PVC as a substrate has been widely used.

Given the recent rise of consciousness toward environmental problems, however, there is a movement to reduce use of PVC and replace it with a material causing less environmental burden. This is because PVC is suspected of generating dioxin and toxic gas, such as chlorine gas, upon incineration. To replace PVC, the use of a polyolefin resin as a substrate has been considered, because it less likely generates dioxin or toxic gas, such as chlorine gas, upon incineration. However, polyolefin resins easily burn as compared to PVC and require addition of a flame retardant. For example, U.S. Pat. No. 4,067,847 proposes addition of an inorganic flame retardant, such as magnesium hydroxide and aluminum hydroxide, which places only a small burden on the environment.

In consideration of the flexibility and stretchability necessary for an adhesive tape, polypropylene, ethylene-propylene copolymer, high density polyethylene and the like, having a relatively high melting point, are not suitable as the polyolefin resin used along with a flame retardant. Instead, a polyolefin resin having a low melting point needs to be used, such as low density polyethylene, linear low density polyethylene, ultra-low density polyethylene, middle density polyethylene, ethylene-vinyl acetate copolymer, ethylene-ethyl acrylate copolymer and the like. These polyolefin resins having a low melting point are flexible and stretch easily, but are susceptible to thermal deformation.

As a method for improving resistance to thermal deformation of a resin film, there have been known a method comprising exposing the film to ionizing radiation, a method comprising previous addition of a crosslinking agent, such as organic peroxide (e.g., dicumylperoxide), to a resin and vapor heating of a film after forming to provide a crosslinking structure in the film, and the like. These methods also increase the number of production steps and production cost to the level that makes their practical use unfeasible.

A different method comprises the use of a mechanically blended polymer mixture of polypropylene, ethylene-propylene copolymer, high density polyethylene and the like, having a relatively high melting point, and an elastomer consisting of ethylene copolymer, such as EPM (ethylene-propylene copolymer rubber), EBR (ethylene-butene rubber), EPDM (ethylene-propylene-diene copolymer rubber) and the like. When a flame retardant is added to this polymer mixture, a molded product thereof becomes very stiff and lacks flexibility at room temperature, making stretchability strikingly low and resistance to thermal deformation insufficient.

It is therefore an object of the present invention to provide an adhesive tape free of generation of dioxin and toxic gas upon incineration, which has high levels of resistance to thermal deformation and flame resistance, as well as a substrate to be used for this adhesive tape.

It is also an object of the present invention to provide an adhesive tape having a high level of stretchability that is beneficial in winding a tape, in addition to high levels of the resistance to thermal deformation and flame resistance, as well as a substrate to be used for this adhesive tape.

SUMMARY OF THE INVENTION

According to the present invention, a thermoplastic resin having a carbonyl oxygen atom in the molecular skeleton and a polymer alloy containing an ethylene component and a propylene component, in combination, are used as an olefin polymer, and a flame retardant is added to give a substrate. As a result, a substrate for an adhesive tape, which shows high levels of resistance to thermal deformation and stretchability, as well as a high level of flame resistance, can be obtained.

Accordingly, the present invention provides an adhesive tape comprising a substrate and an adhesive layer formed on at least one side of the substrate, wherein the substrate comprises an olefin polymer and a flame retardant, but substantially no halogen atom, and the adhesive tape shows a thermal deformation at 100° C. of not more than 65%.

In a preferable embodiment, the adhesive tape shows the following properties. It shows an elongation at break of not less than 150% at a tension speed of 300 mm/min. It shows a dynamic storage modulus (E') at 80° C. of not less than 25 MPa and a dynamic storage modulus (E') at 120° C. of not less than 10 MPa.

The present invention provides a substrate for an adhesive tape, which contains an olefin polymer and a flame retardant but contains substantially no halogen atom, wherein the olefin polymer contains the following Component A and Component B:

Component A: a thermoplastic resin having a carbonyl oxygen atom in the molecular skeleton Component B: a polymer alloy containing an ethylene component and a propylene component In a preferable embodiment, the Component B shows the following properties. It shows a dynamic storage modulus (E') at 80° C. of not less than 40 MPa and less than 180 MPa, and a dynamic storage modulus (E') at 120° C. of not less than 12 MPa and less than 70 MPa. It shows a dynamic storage modulus (E') at 23° C. of not less than 200 MPa and less than 400 MPa. Component A is an ethylene copolymer having a melting point of not more than 120° C., which is obtained by polymerizing a vinyl ester compound and/or α,β-unsaturated carboxylic acid or a derivative thereof, or a metal salt of the ethylene copolymer. Component A and Component B are mixed at a weight ratio (A:B) of 1:9–8:2. The flame retardant is added in an amount of 20–200 parts by weight per 100 parts by weight of an olefin polymer. The flame retardant is a metal hydroxide.

In another preferable embodiment, the substrate has a dynamic storage modulus (E') at 80° C. of not less than 25 MPa, and a dynamic storage modulus (E') at 120° C. of not less than 10 MPa. The substrate is not crosslinked during or after its formation.

DETAILED DESCRIPTION OF THE INVENTION

The adhesive tape of the present invention comprises a substrate containing an olefin polymer and a flame retardant, but contains substantially no halogen atom, and an adhesive layer formed at least on one side of the substrate. The adhesive tape has a thermal deformation at 100° C. of not more than 65% (preferably not more than 40%, particularly preferably 0%), and preferably the thermal deformation of not more than 65% together with an elongation at break of not less than 150% (preferably 170–500%) at a tension speed of 300 mm/min.

As used herein, by the "substantially no halogen atom" is meant non-use of a substance having a halogen atom in a molecule as a material of the substrate. However, a halogen atom detected in an ultra-trace amount by analysis of the composition of a tape substrate using mechanical analysis means is excluded. For example, a halogen atom may be contained in an ultra-trace amount in the substrate, due to the use of a halogen-containing substance as a catalyst for the synthesis of a constituting material.

A thermal deformation at 100° C. and an elongation at break (%) at a tension speed of 300 mm/min of the adhesive tape are respectively used as indices of resistance to thermal deformation and stretchability of the tape. An adhesive tape having a thermal deformation at 100° C. of not more than 65% shows a high level of resistance to thermal deformation in actual use (adhered to a target object). An adhesive tape having an elongation at break of not less than 150% at a tension speed of 300 mm/min shows a high level of stretchability. Therefore, the tape can be easily stretched in actual use (adhered to a target object (winding)) and the adhesion (winding) can be performed with superior workability. The thermal deformation and the elongation at break of the adhesive tape were measured by the following method.

Measurement Method of Thermal Deformation

Figure 1A:
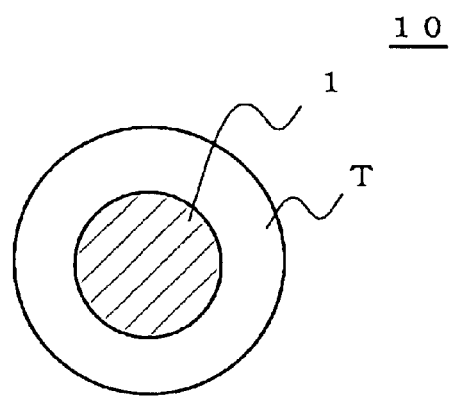
FIG. 1(*a*) and FIG. 1(*b*) show a method for the evaluation of thermal deformation of an adhesive tape, wherein FIG. 1(*a*) is a side view of the test sample, FIG. 1(*b*) is a side view of a test apparatus, 1 is a round bar, 2 is a loading plate, 2*a* is a convex, 3 is a parallel plate, 10 is a test sample and T is an adhesive tape.
Figure 1B:
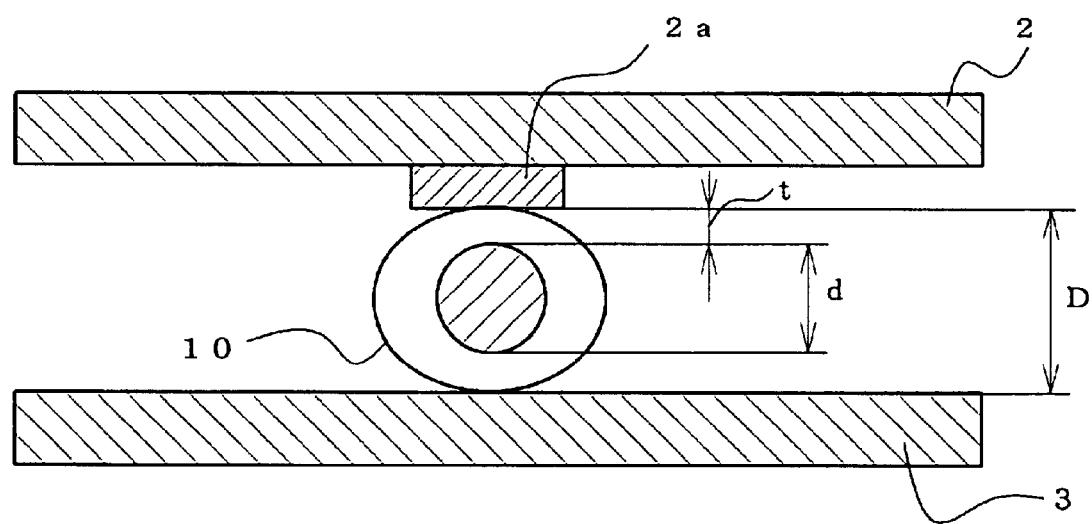

Measured according to UL-510. As shown in FIG. 1(*a*), an adhesive tape T is wound around a round conductor bar 1 having a diameter (d) of 2 mm and a length of 30 mm to prepare a test sample 10. The outer diameter (D0) of the test sample 10 at normal temperature is measured with a dial gauge defined in JIS B 7503, vernier calipers defined in JIS B 7507, or a measurement tool having the same degree of measurement precision. The test sample 10 is placed in a tester heated to a predetermined temperature (100° C.±1.0° C.) and heated for 60 minutes. The test sample is placed between a loading plate 2 having a columnar convex 2*a* having a diameter of 9.5±0.2 mm and a parallel plate 3, as shown in FIG. 1(*b*), pressurized (4.9 N) from the vertical direction of the planar surface of the plates and left standing at a predetermined temperature (100° C.±1.0° C.) for 60 minutes. The test sample is measured for the outer diameter (D1) in situ. The thickness (t0) before heating the tape and the thickness (t1) after heating the tape are calculated from the following formula (II). A decrease in the thickness (thermal deformation (X)) of the tape is calculated from the following formula (III):

$$t=(D-d)/2 \tag{II}$$

wherein D is an outer diameter of the test sample and d is a diameter of the round bar, $$X(\%)=\{(t0-t1)/t0\}\times 100 \tag{III}$$

wherein t0 is a thickness (mm) before heating and t1 is a thickness (mm) after heating.

Measurement Method of Elongation at Break

A test piece (width 19 mm, length 100 mm) taken from an adhesive tape prepared by forming a 30 μm thick adhesive layer on one side of a 0.2 mm thick substrate is held at both ends in the length direction thereof at 23° C., 60% RH, wherein the length direction is the direction of flow during forming a substrate (MD direction), and stretched at a tension speed of 300 mm/min in the length direction by a universal tensile compression tester to measure elongation at break (%).

In the present invention, an adhesive tape having a thermal deformation at 100° C. of not more than 65% can be obtained by using Component A and Component B to be mentioned later as olefin polymers together with a flame retardant, by appropriately determining the kind, mixing weight ratio, combination and the like of Component A and Component B, by using Component B having a specific dynamic storage modulus (E'), by using Component A having a specific melting point, and the like. This also applies to an adhesive tape having a thermal deformation of not more than 65% and an elongation at break of not less than 150% at a tension speed of 300 mm/min.

In the present invention, the olefin polymer constituting a tape substrate can be used without any particular limitation as long as a mixture of the olefin polymer and a flame retardant in an amount to bring about sufficient flame resistance can impart desired superior resistance to thermal deformation and stretchability to an adhesive tape. An olefin polymer mainly containing the following Component A and Component B is preferable.

Component A: a thermoplastic resin having a carbonyl oxygen atom in the molecular skeleton Component B: a polymer alloy containing an ethylene component and a propylene component The thermoplastic resin having a carbonyl oxygen atom (oxygen atom attributable to carbonyl) in the molecular skeleton of Component A activates a flame resistance-imparting action by a flame retardant and imparts appropriate flexibility and fine stretchability to a substrate (adhesive tape). Particularly, a soft polyolefin resin having a carbonyl oxygen atom in the molecular skeleton is preferable. The soft polyolefin resin having a carbonyl oxygen atom in the molecular skeleton may be an ethylene copolymer or a metal salt thereof (particularly ionomer) comprising a vinyl ester compound and/or an α,β-unsaturated carboxylic acid or a derivative thereof as a monomer or a comonomer. In general, it has a melting point of not more than 120° C., preferably 40–100° C. The melting point is measured by a differential scanning calorimeter (DSC).

In the above-mentioned ethylene copolymer or a metal salt thereof (particularly ionomer), the vinyl ester compound may be, for example, lower alkyl ester of vinyl alcohol such as vinyl acetate and the like. The α,β-unsaturated carboxylic acid or a derivative thereof may be, for example, unsaturated carboxylic acids and anhydrides thereof, such as acrylic acid, methacrylic acid, maleic acid, fumaric acid, maleic anhydride, itaconic anhydride and the like; unsaturated carboxylates such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, stearyl acrylate, stearyl methacrylate, lauryl acrylate, lauryl methacrylate, monomethyl maleate, monoethyl maleate, diethyl maleate, monomethyl fumarate, glycidyl acrylate and glycidyl methacrylate; and the like. Of these, alkyl (meth)acrylate, particularly ethyl acrylate, is preferable.

Examples of suitable ethylene copolymer or a metal salt thereof (particularly ionomer) include ethylene-acrylic acid copolymer, ethylene-methacrylic acid copolymer, ethylene-ethyl acrylate copolymer, ethylene-acrylic acid-ethyl acrylate copolymer, ethylene-vinyl acetate-copolymer, ethylene-vinyl acetate-ethyl acrylate copolymer, ethylene-glycidyl methacrylate copolymer, ethylene-glycidyl methacrylate-ethyl acrylate copolymer and a metal salt thereof (particularly ionomer) and the like, which may be used alone or in combination.

The effect of activating a flame resistance-imparting action of a flame retardant by the thermoplastic resin having a carbonyl oxygen atom in the molecular skeleton of Component A cannot be achieved by a thermoplastic resin without a carbonyl oxygen atom in the molecular skeleton.

The polymer alloy containing an ethylene component and a propylene component of Component B mainly suppresses thermal deformation of a substrate (adhesive tape). By making an alloy of an ethylene component and a propylene component, the polymer alloy shows viscoelasticity suitable for suppressing thermal deformation of particularly a substrate (adhesive tape).

The constitution (form) of the polymer alloy is not particularly limited. For example, various constitutions (forms) are acceptable such as (1) a polymer blend (physical mixture) of two or more kinds of polymers physically mixed, (2) a block copolymer or graft copolymer wherein two or more kinds of polymers are bonded by a covalent bond, and (3) an IPN (Interpenetrating Polymer Network) structure wherein two or more kinds of polymers are intertwined without a covalent bond.

The polymer alloy may not be homogeneous in composition but may have a distribution. In addition, it may be an alloy of two or more kinds of compatible polymers or a phase separation structure formed by two or more kinds of incompatible polymers. It may have a thermal property showing plural exothermic or endothermic peaks by DSC measurement.

Examples of the polymer alloy containing an ethylene component and a propylene component of Component B include a physical mixture of polypropylene (homo polypropylene, random polypropylene) and polyethylene (inclusive of copolymer of ethylene and a small amount of other α-olefin), propylene/ethylene copolymer (block copolymer or graft copolymer), terpolymer of propylene, ethylene and α-olefin other than these, and the like. As used herein, by the above-mentioned other α-olefin is meant 1-butene, 1-penten, 1-hexene, 4-methyl-1-pentene, 1-heptene, 1-octene and the like, with preference given to 1-butene. By the homo polypropylene is meant a polymer comprising substantially 100% of propylene and by the random polypropylene is meant a copolymer comprising several percent of ethylene randomly copolymerized.

When the polymer alloy is a copolymer, a copolymer obtained by multi-step polymerization involving two or more steps is preferable, with preference given to a propylene/ethylene copolymer. The copolymer obtained by multi-step polymerization involving two or more steps can be obtained by, as disclosed in JP-A-4-224809, for example, preliminarily polymerizing propylene or propylene and α-olefin other than propylene in the presence of a titanium compound and an organic aluminum compound as catalysts in the first step of the multi-step polymerization, and then copolymerizing propylene and ethylene (after addition of α-olefin other than propylene and ethylene as necessary) in the presence of the produced titanium-containing polyolefin and an organic aluminum compound in the second step or a subsequent step. As a result, the obtained is a copolymer of a polymer produced in the first step [e.g., polypropylene (homopolymer of propylene), propylene-α-olefin copolymer and the like] and a polymer produced in the second step or a subsequent step (e.g., propylene-ethylene copolymer, propylene-ethylene-other α-olefin copolymer, and the like), which copolymer has been blended to a molecular level in the second step or a subsequent step. The above-mentioned titanium compound is, for example, a solid catalyst having an average particle size of 15 μm and is obtained by pulverizing titanium trichloride and magnesium chloride together, and treating with n-butyl orthotitanate, 2-ethylhexanol, ethyl p-toluate, silicon tetrachloride, diisobutyl phthalate and the like. The organic aluminum compound may be, for example, alkyl aluminum such as triethyl aluminum and the like. In a polymerized phase, a silicon compound such as diphenyldimethoxysilane and the like or an iodine compound such as ethyl iodide may be contained as an electron donor.

The polymer alloy containing an ethylene component and a propylene component of Component B preferably shows high elasticity under high temperature, that is, in consideration of the temperature during use of the adhesive tape, it preferably shows a dynamic storage modulus (E') at 80° C. of not less than 40 MPa and less than 180 MPa (preferably within the range of 45–160 MPa) and a dynamic storage modulus (E') at 120° C. of not less than 12 MPa and less than 70 MPa (preferably within the range of preferably 15–65 MPa). The above-mentioned dynamic storage modulus (E') sufficiently suppresses thermal deformation of a substrate (adhesive tape).

The dynamic storage modulus (E') here is measured in the following manner. That is, a polymer alloy test piece (thickness 0.2 mm: width 10 mm, length 20 mm) is prepared, and the dynamic viscoelastic behavior of this test piece at dispersed temperatures is measured with DMS200 (trademark, manufactured by Seiko Instruments) as a measurement apparatus under the measurement conditions of method: extension mode, temperature rise: 2° C./min, frequency: 1 Hz.

Examples of the polymer alloy showing such dynamic storage modulus (E') include trademarks CATALLOY KS-353P, CATALLOY KS-021P and CATALLOY C200F manufactured by Montell SKD Sunrise Ltd., and the like.

The polymer alloy of Component B preferably shows a dynamic storage modulus (E') at 23° C. of not less than 200 MPa and less than 400 MPa in consideration of the workability of the adhesive tape at near room temperature (followability of the adhesive tape to the object to be adhered to). The dynamic storage modulus (E') of this range of the polymer alloy of Component B leads to fine flexibility of the substrate, and therefore, improved followability to the object to be adhered to. The dynamic storage modulus (E')

here is measured by the aforementioned method. Examples of the polymer alloy having such dynamic storage modulus (E') include trademarks CATALLOY KS-353P, CATALLOY KS-021P and CATALLOY C200F manufactured by Montell SKD Sunrise Ltd., and the like.

Component A (a thermoplastic resin having a carbonyl oxygen atom in the molecular skeleton) and Component B (a polymer alloy containing an ethylene component and a propylene component) are mixed at a weight ratio (A:B) of generally 1:9–8:2, preferably 2:8–6:4. When the weight ratio is outside this range and Component A is used in a smaller amount (component B is in a greater amount), the substrate may be poor in flexibility, stretchability and flame resistance. When Component A is used in a greater amount (Component B is in a smaller amount), the substrate may show poor resistance to thermal deformation.

In the present invention, the flame retardant may be, for example, metal hydroxide such as aluminum hydroxide, magnesium hydroxide, zirconium hydroxide, calcium hydroxide, barium hydroxide and the like; metal carbonate such as basic magnesium carbonate, magnesium calcium carbonate, calcium carbonate, barium carbonate, dolomite and the like; metal hydrate (hydrate of metal compound) such as hydrotalcite, borax and the like; barium metaborate, magnesium oxide and the like. These may be used alone or in combination. Of these, one selected from the group of metal hydroxide such as aluminum hydroxide, magnesium hydroxide, zirconium hydroxide, calcium hydroxide, barium hydroxide and the like, basic magnesium carbonate and hydrotalcite, particularly the above-mentioned metal hydroxide, is advantageous in view of flame resistance-imparting effect and economical aspect.

The flame retardant has a particle size that varies depending on the kind of compound. For example, a metal hydroxide, such as aluminum hydroxide, magnesium hydroxide and the like, has an average particle size of about 0.1–50 $\mu$m, preferably 0.5–20 $\mu$m. The particle size here is measured by a laser diffraction method.

The flame retardant is added in an amount of generally 20–200 parts by weight, preferably 40–150 parts by weight, per 100 parts by weight of the olefin polymer. When the amount added of the flame retardant is outside this range and is smaller, sufficient flame resistance cannot be imparted to the substrate (adhesive tape). When it is greater, the substrate (adhesive tape) may become poor in flexibility and stretchability.

With the purpose of encouraging charring of a flame retardant to give a carbonized layer, red phosphous may be used. When using red phosphous, to prevent generation of toxic phosphine even when red phosphous is heated in the presence of water (stabilization of surface of red phosphous), red phosphous may be coated with a film made from metal hydroxide selected from aluminum hydroxide, magnesium hydroxide, zinc hydroxide and titanium hydroxide. Alternatively, a film of a thermosetting resin (phenol resin and the like) may be formed on the metal hydroxide film to cover red phosphous in duplicate. A char forming auxiliary containing such red phosphous is suitably added in a proportion of generally 2–10 parts by weight, preferably 4–8 parts by weight, per 100 parts by weight of the olefin polymer.

When a char forming auxiliary containing red phosphous is used, at least one member selected from carbon black, borates and silicone compounds (silicone oil, silicone rubber, silicone resin and the like) is concurrently used to secure a more preferable effect. In this case, at least one member selected from carbon black, borates and silicone compounds is added in an amount of generally 0.5–10 wt %, preferably 1–5 wt %, per 100 parts by weight of the olefin polymer.

In the present invention, the substrate consists of an olefin polymer and a flame retardant as essential components. Where necessary, an inorganic filler such as titanium oxide, zinc oxide and the like, an age resister and antioxidant such as amine type, quinoline type, hydroquinone type, phenol type, phosphorous type and phosphite type age resisters and the like, an ultraviolet absorber such as salicylic acid derivative, benzophenone type, benzotriazole type and hindered amine type ultraviolet absorbers and the like, a lubricant, a plasticizer and the like may be added.

According to the present invention, the substrate is generally obtained by dry blending a polyolefin polymer, a flame retardant and a substance added as necessary such as filler and the like, kneading the mixture in a Banbury mixer, a roller, an extruder and the like, and forming the kneaded mixture into a film by a known forming method such as compression forming, calendar forming, injection forming, extrusion forming and the like. The substrate (film) has a thickness of generally 0.01–1 mm, preferably 0.05—0.5 mm, though subject to change depending on the use of the adhesive tape.

After film forming, the substrate of the present invention preferably does not undergo a crosslinking treatment comprising an ionizing radiation such as electron beam, $\beta$-ray, $\gamma$-ray and the like, after film forming, or a crosslinking treatment comprising addition, during forming process, of a crosslinking agent, such as organic peroxide and the like, or a crosslinking auxiliary to the material to be formed. In other words, the whole substrate is preferably free of crosslinking structure.

The adhesive tape of the present invention is produced by forming an adhesive layer at least on one side of the above-mentioned substrate. Examples of the adhesive include any adhesive, such as rubber type, hot melt type, acrylic type and emulsion type adhesives, which is currently in use. Examples of preferable base polymer of the rubber and hot melt adhesives include natural rubber, regenerated rubber, silicone rubber, isoprene rubber, styrene-butadiene rubber, polyisoprene, NBR, styrene-isoprene copolymer, styrene-isoprene-butadiene copolymer and the like.

Examples of the tackifier to be used for adhesive include rosin tackifier, terpene tackifier, aliphatic petroleum hydrocarbon (C5) tackifier, aliphatic petroleum hydrocarbon (C9) tackifier, hydrogenated compound and the like. It is also possible to add an additive usually added to the adhesive for an adhesive tape, such as oil, wax, antioxidant and the like in an amount determined by a conventional method.

Of the aforementioned adhesives, an acrylic adhesive is preferable. Examples thereof include homopolymer of (meth)acrylate or a copolymer thereof with a copolymerizable monomer. Examples of (meth)acrylate and the copolymerizable monomer include alkyl(meth)acrylate (e.g., methyl ester, ethyl ester, butyl ester, 2-ethylhexyl ester, octyl ester and the like), glycidyl(meth)acrylate, (meth)acrylic acid, itaconic acid, maleic anhydride, (meth)acrylamide, (meth)acrylic N-hydroxyamide, alkylaminoalkyl(meth) acrylate (e.g., dimethylaminoethyl methacrylate, t-butylaminoethyl methacrylate and the like), vinyl acetate, styrene, acrylonitrile and the like. Of these, the main monomer is preferably alkyl acrylate wherein its homopolymer (single polymer) generally has a glass transition temperature of not more than −50° C.

The adhesive is applied by a conventionally-known method such as cast method, roll coater method, reverse coater method, doctor blade method and the like.

The adhesive layer has a thickness (thickness after drying) that varies depending on the use of the adhesive tape, which is generally 10–50 μm, preferably 15–40 μm.

In the present invention, the adhesive tape preferably has a dynamic storage modulus (E') at 80° C. of not less than 25 MPa and a dynamic storage modulus (E') at 120° C. of not less than 10 MPa. Such dynamic storage moduli make the substrate (adhesive tape) less likely suffer from thermal deformation. In view of the suitable flexibility and stretchability necessary for an adhesive tape, the dynamic storage modulus (E') at 80° C. is preferably not more than 200 MPa, and the dynamic storage modulus (E') at 120° C. is preferably not more than 150 MPa.

The dynamic storage modulus (E') here of the adhesive tape is measured in the following manner. That is, a test piece (width 10 mm, length 20 mm) is taken from an adhesive tape comprising a substrate (thickness 0.2 mm) and an adhesive layer formed thereon, and the dynamic viscoelastic behavior of this test piece at dispersed temperatures is measured with DMS200 (trademark, manufactured by Seiko Instruments) as a measurement apparatus under the measurement conditions of method: extension mode, temperature rise: 2° C./min, frequency: 1 Hz.

The dynamic storage modulus (E') of the adhesive tape is free from an effect of the adhesive layer. That is, the presence of an adhesive layer does not change the value of the dynamic storage modulus (E'), and the dynamic storage modulus (E') is substantially that of the substrate.

In the present invention, an adhesive tape (substrate) having "a dynamic storage modulus (E') at 80° C. of not less than 25 MPa and a dynamic storage modulus (E') at 120° C. of not less than 10 MPa" can be obtained by using the above-mentioned Component A and Component B as olefin polymers together with a flame retardant, by appropriately determining the kind, mixing weight ratio, combination and the like of Component A and Component B, by using Component B having a specific dynamic storage modulus (E'), by using Component A having a specific melting point, and the like.

The present invention is explained in detail in the following by referring to Examples and Comparative Examples. The present invention is not limited by these examples.

Materials Used

Component A (thermoplastic resin having a carbonyl oxygen atom in the molecular skeleton)

A1: ethylene-vinyl acetate copolymer (EVA), melting point 84° C. (trademark: EVAFLEX P-1905, Du Pont-Mitsui Polychemicals Company, Ltd.)

A2: ethylene-ethyl acrylate copolymer (EEA), melting point 84° C. (trademark: EVAFLEX A-702, Du Pont-Mitsui Polychemicals Company, Ltd.)

Component B (polymer alloy containing an ethylene component and a propylene component)

B1: CATALLOY KS-353P (trademark, Montell SKD Sunrise Ltd.)

B2: CATALLOY KS-021P (trademark, Montell SKD Sunrise Ltd.)

B3: CATALLOY C200F (trademark, Montell SKD Sunrise Ltd.)

The dynamic storage moduli (E') at 23° C., 80° C. and 120° C. of the above-mentioned B1–B3 are as follows:

B1 (23° C.: 210 MPa, 80° C.: 52 MPa, 120° C.: 21 MPa)
B2 (23° C.: 294 MPa, 80° C.: 125 MPa, 120° C.: 59 MPa)
B3 (23° C.: 303 MPa, 80° C.: 65 MPa, 120° C.: 20 MPa)

Component C (flame retardant)

C1: magnesium hydroxide (Mg(OH)$_2$) (trademark: Magshizu N-3, Konoshima Chemical Industrial Co., Ltd.)

C2-1: red phosphous (trademark: Hishigard CP-A15, The Nippon Chemical Industrial Co., Ltd.)

C2-2: red phosphous (trademark: Norbaexcell F5, Phosphorus Chemical Industry Co., Ltd.)

C3: carbon black (trademark: Shisuto 3H, TOKAI CARBON CO., LTD.)

Preparation of Substrate and Adhesive Tape

The above-mentioned Component A, Component B and Component C were dry blended, kneaded in a pressurized 3L kneader at 180° C. and pelleted. The composition was formed into a 0.2 mm thick film by a T die extruder to give a substrate. One side surface of the substrate was subjected to a corona discharge treatment and an acrylic adhesive prepared by the following method was applied (thickness 30 μm) to give an adhesive tape.

Preparation of Acrylic Adhesive

In a reaction vessel equipped with a condenser, a nitrogen inlet, a thermometer and a stirrer were placed, in a toluene solvent, 2-ethylhexyl acrylate (100 parts by weight), acrylic acid (2 parts by weight), and benzoyl peroxide (0.2 part by weight) as a polymerization initiator, and the mixture was allowed to react at 60° C. for 8 hours to give a polymer. To this polymer solution was added a polyisocyanate crosslinking agent (trademark: CORONATE L, NIPPON POLYURETHANE INDUSTRY CO., LTD., 3 parts by weight per 100 parts by weight of the polymer solid content) to give an acrylic adhesive.

EXAMPLES 1–7

From Component A, Component B and Component C of the materials and amounts shown in the following Table 1, a substrate (adhesive tape) was prepared according to the above-mentioned forming method.

Comparative Example 1

Using Component A (A1: 100 parts by weight) but without using Component B or Component C, a substrate (adhesive tape) was prepared according to the above-mentioned forming method.

Comparative Example 2

Using Component A (A2: 100 parts by weight) but without using Component B or Component C, a substrate (adhesive tape) was prepared according to the above-mentioned forming method.

Comparative Example 3

Using Component B (B1: 100 parts by weight) but without using Component A or Component C, a substrate (adhesive tape) was prepared according to the above-mentioned forming method.

Comparative Example 4

Using polypropylene (PP) (100 parts by weight, trademark: NOVATEC FX3, Japan Polychem Corporation) but without using Component A, Component B or Component C, a substrate (adhesive tape) was prepared according to the above-mentioned forming method.

Comparative Example 5

Using Component A (A1: 100 parts by weight) and Component C (C1: 50 parts by weight) but without using Component B, a substrate (adhesive tape) was prepared according to the above-mentioned forming method.

Comparative Example 6

Using Component A (A1: 100 parts by weight) and Component C (C1: 100 parts by weight) but without using Component B, a substrate (adhesive tape) was prepared according to the above-mentioned forming method.

Comparative Example 7

Using Component A (A1: 100 parts by weight) and Component C (C1: 105 parts by weight, C2-1: 5 parts by weight) but without using Component B, a substrate (adhesive tape) was prepared according to the above-mentioned forming method.

Comparative Example 8

Using Component A (A1: 100 parts by weight) and Component C (C1: 50 parts by weight, C2-2: 4 parts by weight, C3: 2 parts by weight) but without using Component B, a substrate (adhesive tape) was prepared according to the above-mentioned forming method.

Evaluation of Resistance to Thermal Deformation and Stretchability

To evaluate resistance to thermal deformation, the thermal deformation of an adhesive tape was measured by the aforementioned method, wherein the thermal deformation of not more than 65% was an acceptance value. To evaluate stretchability, the elongation at break of the adhesive tape was measured by the aforementioned method, wherein the elongation at break of not less than 150% was an acceptance value.

These evaluation results and the dynamic storage moduli (E') at 80° C. and 120° C. of the adhesive tape are shown in the following Table 1.

TABLE 1

| | Component A | | Component B | | Component C | | | | Elongation at break (%) | Thermal deformation (%) | Dynamic storage modulus (E') (MPa) | | Oxygen index (%) |
| | | | | | C1 | C2 | | C3 | | | | | |
| | Kind | Amount added | Kind | Amount added | Amount added | Kind | Amount added | Amount added | | | 80° C. | 120° C. | |
|---|---|---|---|---|---|---|---|---|---|---|---|---|---|
| Example 1 | A2 | 60 | B1 | 40 | 100 | C2-1 | 8 | 2 | 390 | 58 | 58 | 19 | 31 |
| Example 2 | A1 | 50 | B1 | 50 | 100 | C2-2 | 8 | 2 | 310 | 45 | 67 | 23 | 32 |
| Example 3 | A1 | 20 | B1 | 80 | 100 | C2-2 | 8 | 2 | 270 | 23 | 89 | 27 | 30 |
| Example 4 | A1 | 20 | B1 | 80 | 80 | C2-2 | 8 | 2 | 470 | 25 | 84 | 25 | 28 |
| Example 5 | A1 | 20 | B2 | 80 | 100 | C2-2 | 8 | 2 | 220 | 23 | 197 | 79 | 30 |
| Example 6 | A1 | 20 | B3 | 80 | 100 | C2-2 | 8 | 2 | 230 | 23 | 148 | 40 | 29 |
| Example 7 | A2 | 20 | B1 | 80 | 50 | C2-1 | 8 | 2 | 290 | 34 | 114 | 15 | 28 |
| Com. Ex. 1 | A1 | 100 | — | — | — | — | — | — | 720 | 100 | 11 | X | 20 |
| Com. Ex. 2 | A2 | 100 | — | — | — | — | — | — | 720 | 100 | 11 | X | 20 |
| Com. Ex. 3 | — | — | B1 | 100 | — | — | — | — | 820 | 19 | 52 | 21 | 18 |
| Com. Ex. 4 | — | — | PP | 100 | — | — | — | — | 630 | 5 | 214 | 42 | 17 |
| Com. Ex. 5 | A1 | 100 | — | — | 50 | — | — | — | 760 | 100 | 12 | X | 22 |
| Com. Ex. 6 | A1 | 100 | — | — | 100 | — | — | — | 610 | 100 | 17 | X | 24 |
| Com. Ex. 7 | A1 | 100 | — | — | 105 | C2-1 | 5 | — | 280 | 100 | 16 | X | 38 |
| Com. Ex. 8 | A1 | 100 | — | — | 50 | C2-2 | 4 | 2 | 820 | 100 | 13 | X | 32 |

Evaluation Test

The substrates (adhesive tapes) of Examples 1–7 and Comparative Examples 1–8 were subjected to the following evaluation tests. The dynamic storage moduli (E') at 80° C. and 120° C. of the adhesive tape were measured by the aforementioned method.

Evaluation of Flame Resistance

At the step of forming into a 3 mm thick sheet using a press machine during the formation of the aforementioned substrate, a test piece (size:length 70 mm, width 6.5 mm) was taken from the sheet and this test piece was burnt according to the incineration test method of polymer material by the oxygen index method according to JIS K 7201 to examine if the test piece continued to burn for 3 minutes or longer. In addition, the amount of minimum oxygen flow necessary for continuous flame burning of not less than 50 mm thereof after flame burning, and the nitrogen flow at that time were measured by a flowmeter (Candle Type Flammability Tester, TOYO SEIKI SEISAKU-SHO Co., Ltd.). The oxygen index was calculated from the following formula (I) and the flame resistance was evaluated based on the oxygen index. The flame resistance of not less than 25% was an acceptance value and less than 25% was a rejection value.

$$\text{Oxygen index (O.I.)} = \{[O_2]/([O_2]+[N_2])\} \times 100 \quad (I)$$

wherein $[O_2]$ is an oxygen flow (l/min) and $[N_2]$ is a nitrogen flow (l/min).

In the Table, the amounts of Component A, Component B and Component C are in parts by weight, and X means that the adhesive tape (substrate) was melted and the dynamic storage modulus (E') could not be measured. The thermal deformation of 100% means that an adhesive tape was melted and dropped from the round bar, thus failing to maintain the shape of a tape. The polypropylene (PP) used in Comparative Example 4 is conveniently listed in the column of Component B.

As is evident from the foregoing explanation, the substrate for an adhesive tape of the present invention contains an olefin polymer and a flame retardant but substantially no halogen atom, and the adhesive tape has a thermal deformation at 100° C. of not more than 65% and an elongation at break of not less than 150% at a tension speed of 300 mm/min. Consequently, the adhesive tape has suitable flexibility, a high level of stretchability and a high level of resistance to thermal deformation, despite the existence of the flame retardant, and a high level of flame resistance, and is free of generation of dioxin and toxic gas, such as chlorine gas, upon incineration.

This adhesive tape can be sufficiently used as a substitute for an adhesive tape using a PVC substrate, which has been used as an insulating tape for electric equipment used in the fields of vehicles, such as automobile, train, bus and the like, aircraft, ship, house, plant and the like. Inasmuch as it is free of generation of dioxin and toxic gas upon incineration and places less burden on the environment, the adhesive tape is highly valuable for use.

This application is based on a patent application Nos. 314103/1999 and 0288649/2000 filed in Japan, the contents of which are hereby incorporated by reference.

What is claimed is:

1. An adhesive tape comprising a substrate and an adhesive layer formed on at least one side of the substrate, wherein the substrate comprises an olefin polymer and a flame retardant, but substantially no halogen atom, and the adhesive tape has a thermal deformation at 100° C. of not more than 65%, wherein the olefin polymer comprises the following Component A and Component B:

Component A: a thermoplastic resin having a carbonyl oxygen atom in the molecular skeleton;

Component B: a propylene/ethylene copolymer obtained by multi-step polymerization involving two or more steps;

wherein the Component A is an ethylene copolymer or a metal salt thereof, having a melting point of not more than 120° C., which is obtained by polymerizing a vinyl ester compound, or an α,β-unsaturated carboxylic acid or a derivative thereof, or the vinyl ester compound and the α,β-unsaturated carboxylic acid or a derivative thereof, and wherein the Component B has a dynamic storage modulus (E') at 23° C. of not less than 200 MPa and less than 400 MPa, a dynamic storage modulus (E') at 80° C. of not less than 40 MPa and less than 180 MPa, and a dynamic storage modulus (E') at 120° C. of not less than 12 MPa and less than 70 MPa.

2. The adhesive tape of claim 1, which has an elongation at break of not less than 150% at a tension speed of 300 mm/min.

3. The adhesive tape of claim 1, wherein the Component A and the Component B are mixed at a weight ratio (A:B) of 1:9–8:2.

4. The adhesive tape of claim 1, wherein the flame retardant is added in an amount of 20–200 parts by weight per 100 parts by weight of the olefin polymer.

5. The adhesive tape of claim 1, wherein the flame retardant is a metal hydroxide.

6. The adhesive tape of claim 1, which has a dynamic storage modulus (E') at 80° C. of not less than 25 MPa and a dynamic storage modulus (E') at 120° C. of not less than 10 MPa.

7. The adhesive tape of claim 1, wherein the substrate is not crosslinked during or after a forming process thereof.

8. A substrate for an adhesive tape, which comprises an olefin polymer and a flame retardant, but substantially no halogen atom, wherein the olefin polymer comprises the following Component A and Component B:

Component A: a thermoplastic resin having a carbonyl oxygen atom in the molecular skeleton;

Component B: a propylene/ethylene copolymer obtained by multi-step polymerization involving two or more steps;

wherein the Component A is an ethylene copolymer or a metal salt thereof, having a melting point of not more than 120° C., which is obtained by polymerizing a vinyl ester compound, or an α,β-unsaturated carboxylic acid or a derivative thereof, or the vinyl ester compound and the α,β-unsaturated carboxylic acid or a derivative thereof, and wherein the Component B has a dynamic storage modulus (E') at 23° C. of not less than 200 MPa and less than 400 MPa, a dynamic storage modulus (E') at 80° C. of not less than 40 MPa and less than 180 MPa, and a dynamic storage modulus (E') at 120° C. of not less than 12 MPa and less than 70 MPa.

9. The substrate of claim 8, wherein the Component A and the Component B are mixed at a weight ratio (A:B) of 1:9–8:2.

10. The substrate of claim 8, wherein the flame retardant is added in an amount of 20–200 parts by weight per 100 parts by weight of the olefin polymer.

11. The substrate of claim 8, wherein the flame retardant is a metal hydroxide.

12. The substrate of claim 8, which has dynamic storage modulus (E') at 80° C. of not less than 25 MPa and a dynamic storage modulus (E') at 120° C. of not less than 10 MPa.

13. The substrate of claim 8, which is not crosslinked during or after a forming process thereof.

* * * * *